3,296,887
VIBRATION DAMPER
Hugh W. Larsen, Milford, Mich., assignor to General Motors Corporation, Detroit, Mich., a corporation of Delaware
Filed Oct. 23, 1964, Ser. No. 406,988
6 Claims. (Cl. 74—574)

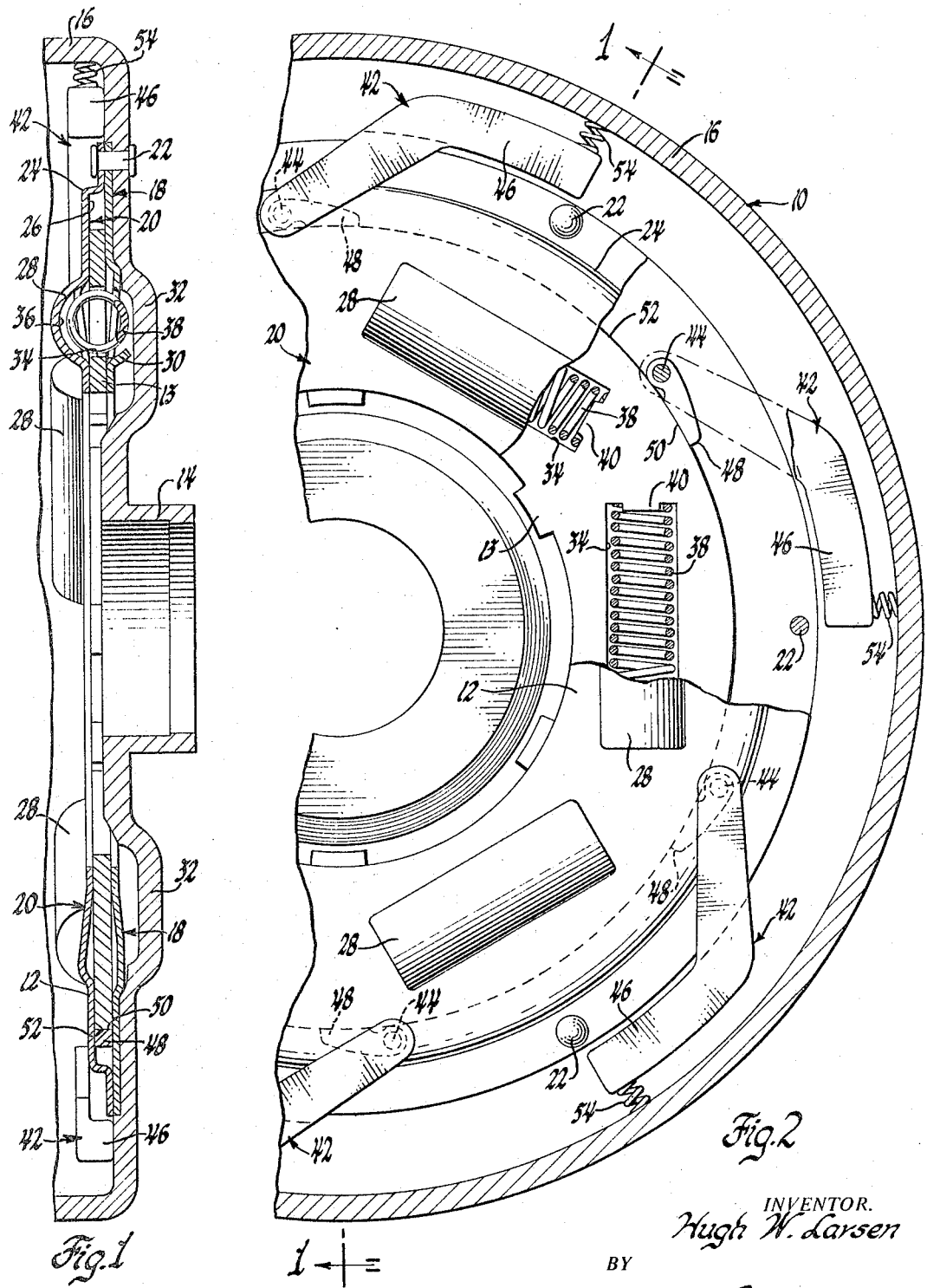

This invention relates to vibration dampers, and more particularly to a torsional vibration damper for use in a motor vehicle and located between the vehicle engine and the transmission or output unit.

Automobile drivelines generally employ a vibration damper between the engine and the transmission or other output unit. The purpose of a vibration damper is to take up torsional vibration generally excited by engine firing pulsations. It has been generally found that such torsional vibrations become audible as a resonant vibration at some given engine speed. This resonant vibration frequently appears as an annoying rattling or whinning sound.

A study of torsional responsive characteristics has shown that when such a torsional damper applies very little or no friction the resonant vibration will occur at a low engine speed. It has further been found that when the friction of such a torsional damper is extremely large the resonant vibration will occur at a higher engine speed. It therefore has been realized that negligible resonant disturbance will occur at lower engine speeds if a torsional damper with a large value of friction is used, and that negligible resonant disturbance will occur at high engine speeds if a torsional damper with no friction is used. Hence, there is a need for a torsional damper which will provide a large value of friction at low engine speeds thereby eliminating low speed resonant vibrations, and which will change its operational characteristics with engine speed so as to provide a minimum amount of friction at higher engine speeds thereby eliminating high speed resonant vibrations. Therefore, it is an object of the subject invention to provide a torsional vibration damper which will fulfill these desired operating characteristics.

The device in which this invention is embodied comprises, generally, a vibration damping device in which a driving member is connected to an engine crankshaft and a driven member is connected to a transmission or other unit. A plurality of mass elements are pivotally secured to the driving member and have friction arms adapted to engage the driven member in such a manner that at low engine speeds the friction arms will prevent rotation of the driven member relative to the driving member. At high engine speeds, the movement of the mass elements, due to centrifugal force, will remove the friction arms from the driven member to permit compression springs to take up the engine vibrations.

With a construction of this nature, the torque transmission from the engine to the transmission can be through a connection having a relatively stiff torsional spring rate at low engine speeds and a relatively soft torsional spring rate at high engine speeds, providing effective vibration control in both cases.

These and other advantages will become more apparent from the following description and drawings in which:

FIGURE 1 is a cross-sectional view of the vibration damper embodying the invention taken substantially along the line 1—1 of FIGURE 2 and looking in the direction of the arrows.

FIGURE 2 is a view of the vibration damper embodying the invention with parts broken away and in section to illustrate the location of the various parts.

Referring more particularly to the drawings, the vibration damper is shown to include a driving member, illustrated generally by the numeral 10, and a driven member, illustrated generally by the numeral 12. Driving member 10 has a central hub 14 formed thereon, the hub being suitably connected to the engine crankshaft or the like. The driven member 12 has teeth 13 coupled to a device such as the transmission of the vehicle. A flange 16 is formed from the outer periphery of the driving member 10 and encloses the remainder of the vibration damper.

A pair of mounting plates, illustrated generally by the numerals 18 and 20 respectively, are secured to the driving member 10 by a plurality of rivets 22, at spaced points around the periphery of the plates 18 and 20. Plate 20 includes an offset portion 24 at its outer periphery, in order to provide an annular chamber 26 between the two plates 18 and 20. The driven member 12 is received in the chamber 26 between the two plates.

Plate 20 has a plurality of semi-cylindrical recesses 28 formed therein, and at several points therearound, and plate 18 has a plurality of similarly formed recesses 30 adjacent the portions 28 on the plate 20. Driving member 10 also has an annular land 32 formed therein and at a radial distance outwardly the same distance as the location of the recesses 28 and 30 in the plates 18 and 20.

The driven member 12 is provided with a plurality of slots 34, within the chambers 36 formed by the recesses 28, 30 and 32 of the plates 20, 18 and the driving member 10 respectively.

In each of the chambers 36, a compression spring 38 is disposed, the spring 38 being seated on projections 40 formed in the driven member 12 and extending into the slot 34. The springs are adapted to abut the end walls of the semi-cylindrical recesses 28 and 30 and the driven member 12, in such a manner as to permit limited rotational movement of the driven member 12 with respect to the plates 18 and 20, and consequently with respect to the driving member 10 since the plates 18 and 20 are secured thereto.

The purpose for this construction is to reduce transmission of torsional vibrations to the driven member 12 from the vehicle engine.

A plurality of mass elements, illustrated generally by the numeral 42, are pivotally secured in the driving member 10 by pivot pins 44. The mass elements are so constructed that the outward ends 46 contain most of the weight and are disposed as far as is conveniently possible from the center of the unit.

A friction arm 48 is carried by the pivot pin 44 associated with each of the mass elements 42, and is rigidly secured thereto in such a manner that rotation of the mass element 42 about the pivot pin 44 will also cause rotation of the friction arm 48. The friction arm 48 has a surface 50, adapted to engage the edge 52 of the driven member 12 when in its inward position. When in this position, the friction arms 48 prevent relative rotation of the driven member 12 with respect to the driving member 10 due to the friction between the rubbing surfaces. This action occurs at low engine speed causing the resonant torsional vibration frequency of the driveline to be at a relatively high frequency when firing pulsations from the engine are at a relatively low frequency. The excitation frequency thus does not coincide with the resonant frequency and excessive torsional vibrations do not occur.

In order to keep the friction arms 48 in contact with the driven member 12 at low engine speeds, and to permit the friction arms 48 to disengage from the driven member 12 at high rotational speeds, a spring member 54 is disposed between each of the mass elements 42 and the inner side of the flange 16 of the driving member 10. The spring rate of the springs 54 is sufficient to bias the mass elements in an inward direction during low engine speeds, and to permit the centrifugal force of the mass element at a predetermined engine speed to overcome the spring rate and allow the friction arms 48 to disengage from the driven member 12.

It is to be understood that some other type of resilient means or some other placement of a spring may be utilized in order to bias the mass elements 42 in the proper direction such as a torsion spring mounted about the pivot pin 44.

The operation of the vibration damper is such that at low engine speeds the friction arms 48 contact the driven member 12, due to the force of the springs 54 on the mass elements 42. Thus, at low engine speeds the torque transmission from the driving member 10 to the driven member 12 will be through a relatively stiff torsional connection. At high engine speeds, the mass elements 42 overcome the spring rate of the springs 54, due to the centrifugal force caused by the rotation of the structure, and disengage the friction arms 48 from engagement with the driven member 12. This permits the compression springs 34, acting between the plates 18 and 20 and the driven member 12, to take up torsional vibrations excited by engine firing pulsations or the like. Thus, at high engine speeds it may be seen that the torque transmission, from the engine crankshaft, through the driving member 10 to the driven member 12, and thence to the transmission or other driving unit, will be through a relatively soft elastic connection.

Hence, it can be seen that the subject invention provides a vibration damper which produces a high effective value of friction at low engine speeds to eliminate the characteristic resonant vibration occurring there, and which reduces this friction to a very small value at high engine speeds to eliminate the characteristic resonant vibration occurring there. Therefore, the subject vibration damper substantially eliminates resonant vibration occurring during the transmission of motion from the engine to the transmission over the full range of engine speeds.

Although but one embodiment of the subject invention has been described, it should be clear to those skilled in the art to which this invention pertains, that many changes and modifications may be made thereto without departing from the scope of the invention.

I claim:
1. A torsional vibration damper comprising:
   a driving member;
   a driven member resiliently secured to said driving member and rotatable with respect thereto;
   a plurality of mass elements pivotally secured to said driving member;
   a friction applying means fixed to each of said mass elements and rotatable therewith;
   and means for biasing said mass elements and said friction applying means to engage said friction applying means with said driven member during periods of low rotational speed of said driving member to cause said driving member and said driven member to rotate together, said mass elements being adapted to be rotated by centrifugal force to overcome said biasing means during periods of high rotational speed of said driving member to disengage said friction applying means from said driven member.

2. A torsional vibration damper comprising:
   a driving member;
   a driven member resiliently secured to said driving member and rotatable with respect thereto;
   a plurality of mass elements pivotally secured to said driving member;
   a friction applying arm fixed to each of said mass elements and rotatable therewith;
   and spring means for biasing said mass elements and said friction applying arms to engage said friction applying arms with said driven member during periods of low rotational speed of said driving member to cause said driving member and said driven member to rotate together, said mass elements being adapted to be rotated by centrifugal force to overcome said biasing means during periods of high rotational speed of said driving member to disengage said friction applying arms from said driven member.

3. A torsional vibration damper comprising:
   a driving member;
   a driven member resiliently secured to said driving member and rotatable with respect thereto;
   a plurality of first spring means resiliently securing said driven member to said driving member;
   a plurality of mass elements pivotally secured to said driving member;
   a friction applying arm fixed to each of said mass elements and rotatable therewith;
   and a second spring means for biasing said mass elements and said friction applying arms to engage said friction applying arms with said driven member during periods of low rotational speed of said driving member to cause said driving member and said driven member to rotate together, said mass elements being adapted to be rotated by centrifugal force to overcome said second spring means during periods of high rotational speed of said driving member to disengage said friction applying arms from said driven member and permit the transmission of torsional vibrations from said driving member to said driven member to be taken up by the action of said plurality of first spring means.

4. A torsional vibration damper for use with an internal combustion engine comprising:
   a driving member secured to the output shaft of said engine;
   a pair of plates secured to said driving member and having a plurality of chambers formed therein and spaced therearound;
   a driven member between said pair of plates and rotatable with respect thereto, said driven member having a plurality of slots formed therein and within said chambers;
   first spring means in said chambers and abutting said driven member to bias said driven member into position with respect to said pair of plates;
   a plurality of mass elements pivotally secured to said driving member and rotatable with respect thereto;
   friction applying arms fixed to said mass elements and rotable therewith;
   and second spring means between said mass elements and said driving member to bias said mass elements and said friction arms for engagement of said friction arms with said driven member to frictionally secure said driven member for rotation with said driving member during periods of low rotational speed of said driving member, said mass elements being adapted to be rotated by centrifugal force to overcome said second spring means during periods of high rotational speed of said driving member to disengage said friction arms from said driven member and to permit said first spring means to take up torsional vibrations in said engine.

5. For use between a variable speed engine and a load driven by such engine a torsional vibration damper comprising:
   a driving member adapted to be connected to such engine;
   a driven member adapted to be connected to such load and rotatable with respect to said driving member; and
   torque transmitting means including both torsionally elastic and torsionally inelastic means connecting said members, said inelastic means being responsive to the rotational speed of said members to disconnect the inelastic connection of said members above a predetermined rotational speed while retaining said elastic connection whereby the torsional resonance characteristics of said vibration damper are varied such that it has a high resonant frequency at low rotational speeds and a low resonant frequency at high rotational speeds.

6. A torsional vibration damper as defined in claim 5 wherein said torsionally inelastic torque transmitting means comprise:

friction applying means connecting said driving and driven members; and speed responsive actuating means connected with said friction applying means and effective to separate the connection of said driving and driven means by said friction applying means above a predetermined rotational speed.

References Cited by the Examiner

UNITED STATES PATENTS

| | | | |
|---|---|---|---|
| 2,367,709 | 1/1945 | Arkus-Duntov et al. | 74—574 |
| 2,844,972 | 7/1958 | Spase | 74—574 |

FRED C. MATTERN, Jr., *Primary Examiner.*

W. S. RATLIFF, *Assistant Examiner.*